United States Patent Office.

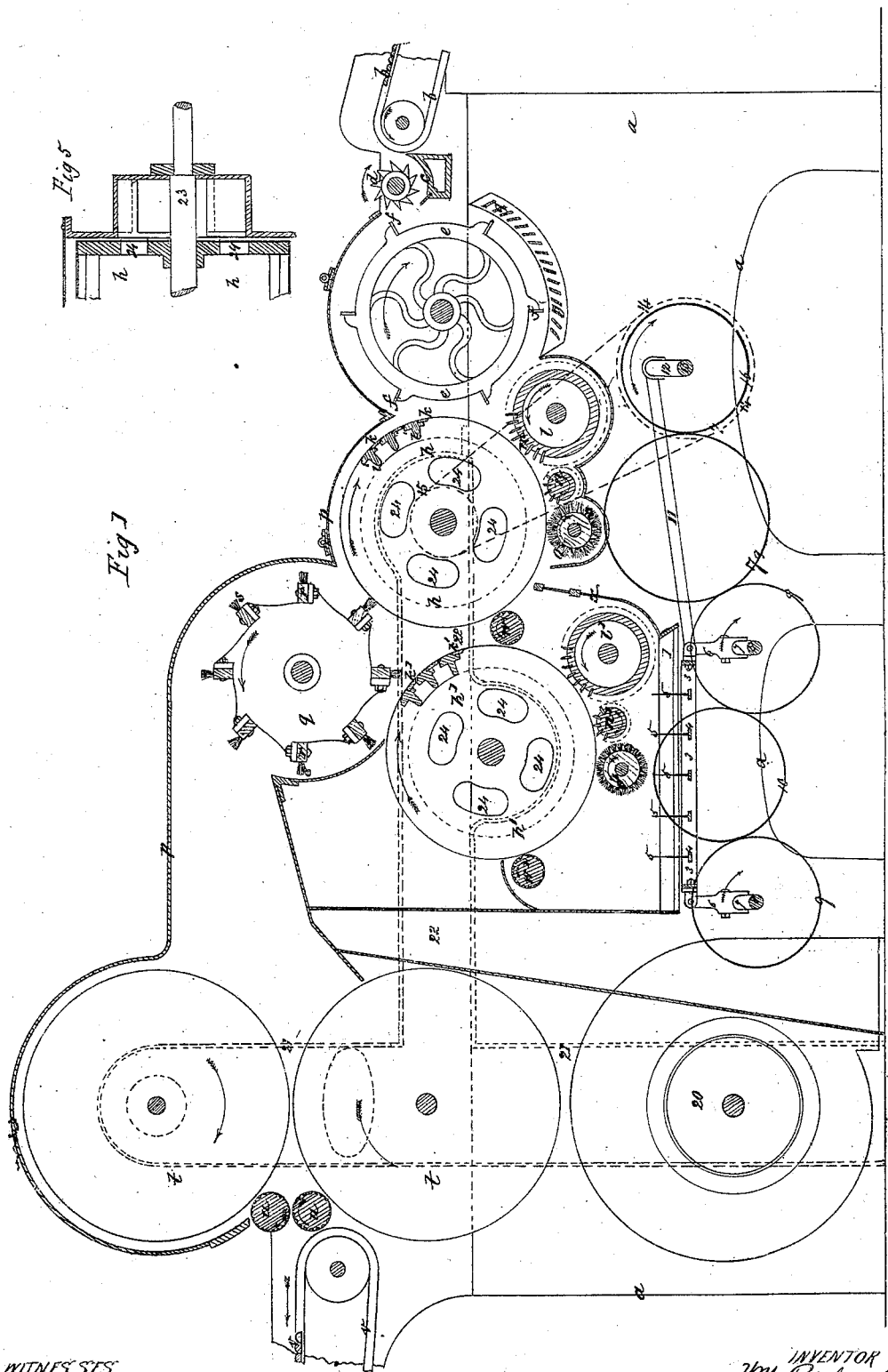

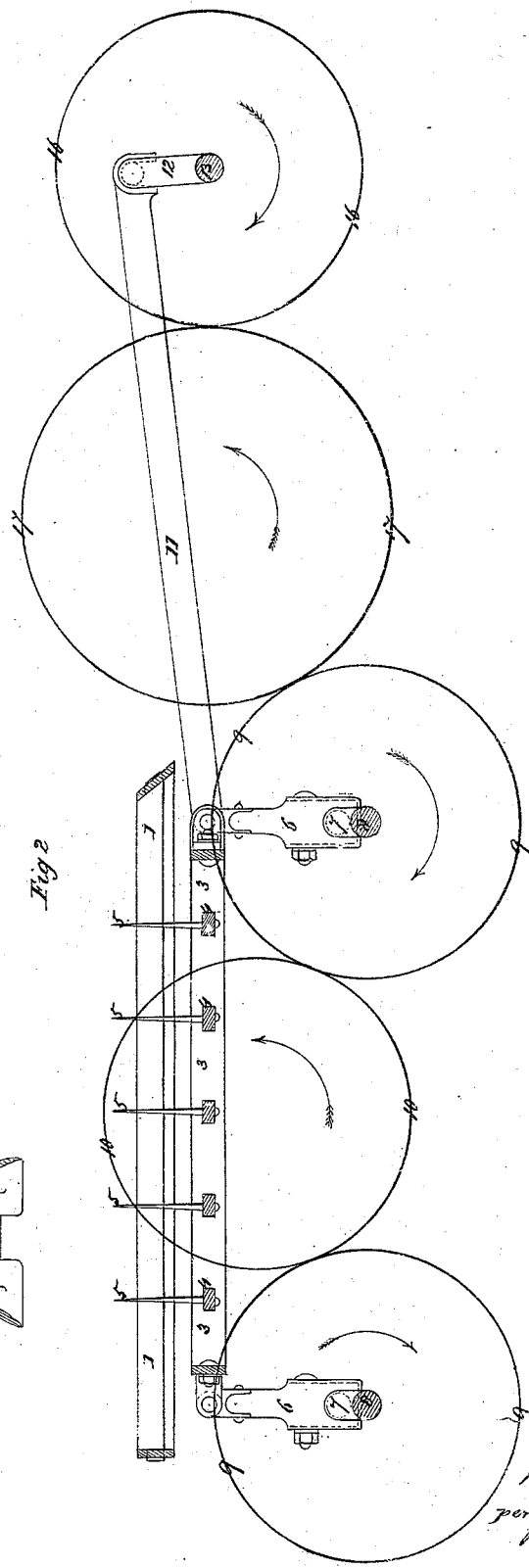

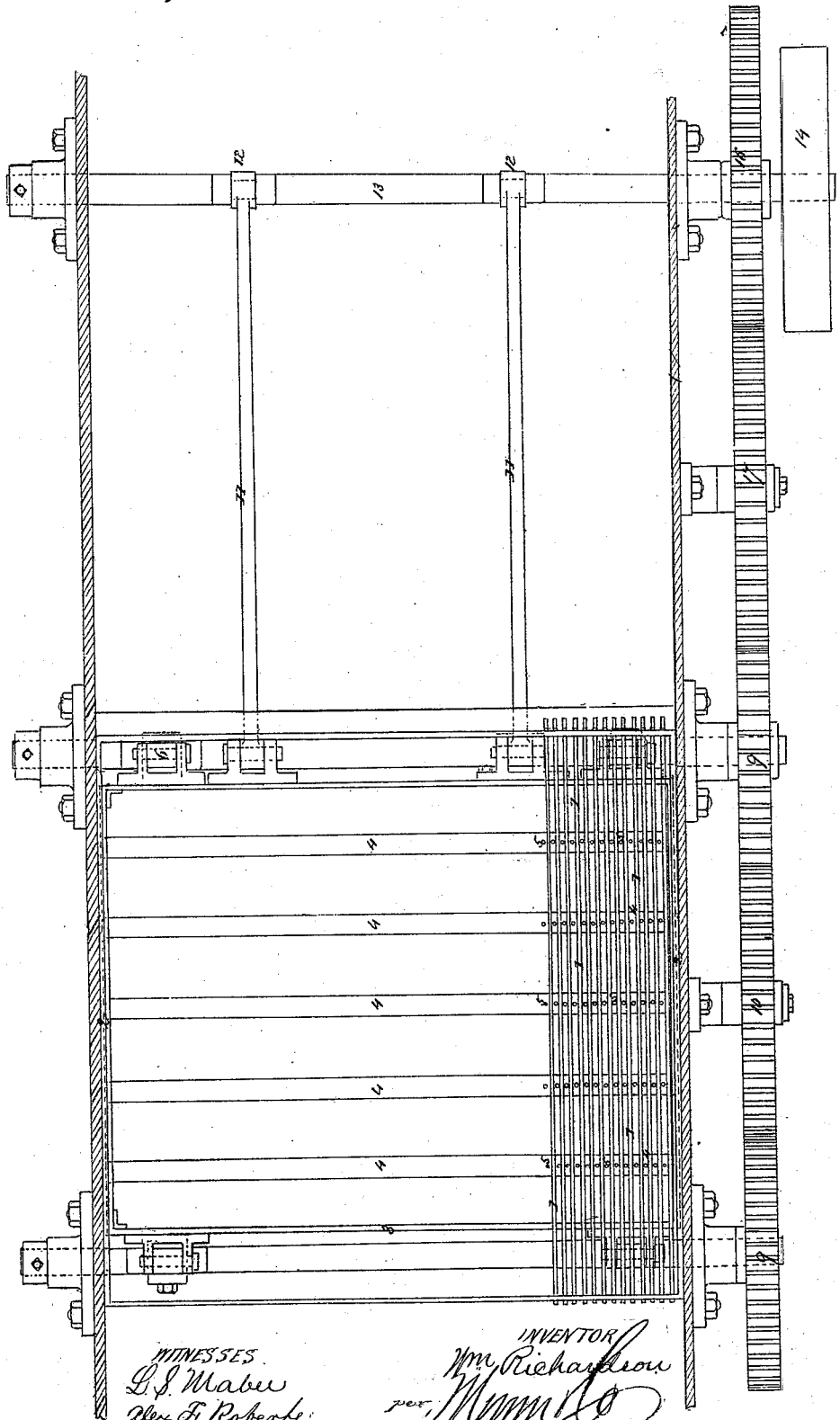

WILLIAM RICHARDSON, OF OLDHAM, GREAT BRITAIN.

Letters Patent No. 111,004, dated January 17, 1871.

IMPROVEMENT IN MACHINES FOR BURRING WOOL, &c.

The Schedule referred to in these Letters Patent and making part of the same.

*To all whom it may concern:*

Be it known that I, WILLIAM RICHARDSON, of Oldham, in the county of Lancaster in England, have invented certain new and useful Improvements in Machinery for Burring or Cleaning Wool, Cotton, and other fibrous materials; and I do hereby declare that the following is a full, clear, and exact description thereof, which will enable others skilled in the art to make and use the same, reference being had to the accompanying drawing forming part of this specification.

My invention refers to those descriptions of burring or cleaning-machines in which a "fine-comb cylinder" is employed, and from which burrs, seeds, and other impurities are stripped, while the cleaned material is carried forward to be removed by a revolving brush, or similar apparatus, and consists—

Firstly, in the employment, in combination with two or more such fine-comb cylinders, of sets or series of rollers and brushes, arranged as hereinafter described, whereby the material fed to the said cylinders is operated upon in a peculiar and effective manner.

Secondly, in the use of certain apparatus whereby the rejected material from the first cylinder is transferred back to the last cylinder, or to the same cylinder again when one only is used, without being mingled with the incoming fresh material, and whereby the said rejected material is further deprived of burrs, seeds, or other impurities, and is also, to a certain extent, opened out.

In order to explain the operation of these points of novelty, I shall have to refer in general terms to some ordinary working parts of a burring or cleaning-machine, but will subsequently point out that which I claim as my invention.

Figure 1 represents in section a machine constructed according to my invention, and Figures 2, 3, and 4, detached views of my transferring apparatus, the construction of which will be described after I have pointed out the general operation of the machine.

The feed-apron upon which the material is placed is shown at $b$, carried by the frame $a$. This apron, by its traveling motion, delivers the fibrous material to the spiked feed-roller $d$ and dish $c$, by which it is transferred to the beater-blades $f$, mounted upon the cylinder $e$, and the dirt separated falls through a grid $g$.

At $h$ is what is commonly called the fine-comb cylinder, provided with combs $k$.

Beneath this cylinder is a roller, $l$, in which is fixed a parallel series of notched blades, $m$, extending around its circumference, and at $n$ is another similar roller, beyond which is a rotary brush, $o$.

The cylinder $h$ is provided with a casing $p$, an extension of which incloses revolving disks $q$, which carry cross-bars $r$, furnished with brushes $s$, revolving in contact with the combs $k$.

Within the casing $p$ are also cages $t$, such as are used in scutchers and other machines of that class, and from which air is exhausted in the usual manner; but these cages are not necessarily used. Beyond these cages are rollers $u$, which deliver the material to the traveling-apron $v$.

The arrangements for driving the various parts are not shown in the drawing, as they may be of any ordinary character; but in order to lead to my invention I will, in the first place, point out the usual action of the operating parts.

The material placed upon the traveling apron $b$ is conveyed thereby to the dish and roller $c$ $d$, the latter of which passes it forward to the action of the blades $f$, by which it is torn away in a partially opened state and thrown toward the fine-comb cylinder $h$ and roller $l$, the blades $m$ of which feed it to the combs $k$. The said blades $m$, however, retain a certain portion, and this is removed from them by the roller $n$ and transferred, to a great extent, to the combs $k$; and any material remaining on the roller $n$ is removed and fed to the combs $k$ by the brush $o$. The combs $k$ thus become charged with tufts of the material which arrive in contact with the roller $w$, and this, by its rapid rotation, removes burrs and other impurities, together with some fibrous material, and throws them downward from the machine. After this, the rotating brushes $s$, acting against the material, strip it from the combs $k$, and pass it through the casing $p$ to the cage $t$, from whence it is conducted by the rollers $u$ to the traveling apron $v$, to be removed in any required condition.

It will be seen by the foregoing description that, as the roller $n$ has to strip the roller $l$, the surface speed of the former must be the greater, and that the surface speed of the brush $o$ must be greater still, and that the same remark applies to the brush $s$ in reference to the cylinder $h$.

Having thus alluded to the working of an ordinary burring-machine, and to the several parts of which as above described, I make no claim, I will proceed to point out the distictive feature of the first part of my invention.

Beyond the roller $w$, and running clear of it, is a second fine-comb cylinder $h'$ in connection with which there are transferring-rollers $l'$ $n'$ and brush $o'$, and corresponding to the roller $w$ is a second roller, $w'$.

It has been described, in reference to the cylinder $h$, that the burrs, seeds, and other impurities, are finally detached by the roller $w$, and it has been assumed that when so detached they fall to the bottom of the machine; but, according to my invention, I transfer them to the second fine-comb cylinder $h'$, again to undergo the treatment already referred to.

The second part of my invention relates to a special method of effecting this transference, but I will at present assume that the roller $w$ discharges the removed portions upon the roller $l'$, which, together with the next roller and brush, is inclosed in a casing $x$. These being the conditions, the material will be carried upward by the roller $l'$ and fed to the cylinder $h'$, the other roller $n'$ and brush $o'$ performing the same operations as those described in reference to the first set, $l\ n\ o$.

After the charged combs $k'$ have passed the brush $o'$ they meet with the revolving roller $w'$, which strips the remaining burrs, &c., casting them downward, as I will now assume, into any convenient receptacle.

The combs charged with cleaned material passing onward, meet with the rotating brush $s$, which, being placed midway between the two cylinders, acts as a stripper for both, and the said material is delivered as before described.

In order to show the object of my invention, it should be observed that the burrs, &c., which are cast down according to the usual mode of operating, contain a certain amount of fibrous material, and, in some cases, it has been proposed to return them to the machine to undergo a second operation; but in such cases they have become mingled with the incoming raw material so as to pass with it to the fine-comb cylinder, or they have been mingled with it upon the said cylinder; but, according to my invention, the burrs and other impure parts are not returned thereto, but pass on to the second cylinder $h'$, from which they are removed and cast downward by the roller $w'$. Instead, however, of allowing the roller $w'$ to throw the burrs and mixed fibrous materials at once from the machine, I prefer to conduct them back to the roller $l'$, so that they may again be taken by the fine-comb cylinder $h'$, and the second part of my invention consists in a special arrangement for this purpose, which I will now proceed to describe, referring to fig. 1, above mentioned, and to the detached views, figs. 2, 3, 4, which are drawn upon an enlarged scale.

At 1 is a grid, carried by a frame, 2, which is attached to the frame-work of the machine. Beneath this grid is a frame 3, provided with cross-bars 4, on which are mounted rows of spikes, 5, capable of projecting through the bars of the said grid.

To the frame 3 are jointed connecting-rods 6, extending from cranks 7 upon shafts 8, provided with spur-wheels 9, and these two shafts are geared together by an intermediate wheel, 10.

To the frame 3 are also jointed connecting-rods 11, extending from cranks 12 upon a shaft, 13, which is driven by pulleys 14 15, the latter being on the axis of the comb-cylinder $h$, and upon this shaft 13 is a spur-wheel, 16, which, by means of an intermediate wheel, 17, drives the spur-wheel 9 on one of the axes 8.

The operation of this part of my invention is as follows, assuming that the burs or other impurities, together with a certain amount of fibrous material, are driven by the roller $w'$ onto the grid 1, and that the freed impurities fall at once through the said grid:

The rotary motion of the cylinder $n$ will, by means of the pulleys 14 15, spur-wheels 16, 17, 9, impart rotatory motion to the cranks 7, while, at the same time, the shaft 13 will be driven, and rotatory motion will be given to the cranks 12.

By the action of the cranks 7 the spikes 5 will be caused to rise between the bars of the grid 1 and through the material resting thereon, while, at the same time, the other cranks 12 will push the said spikes toward the front of the machine, and then a further rotation of the said cranks 7 will pull down the spikes 5 a little below the surface of the grid, and they will then be conveyed backward by the cranks 12 ready to be again thrust upward and carried forward.

By this traveling motion of the spikes 5 the spaces of the grid are kept from being clogged by the rejected material beneath the roller $w'$, and the refuse matters are thereby enabled to fall through, as above described; and when they are above the grid the material is, to a certain extent, opened and deprived of a further quantity of impurities, which fall through the grid, while, at the same time, the fibrous material is carried forward by the said spikes and fed to the roller $l'$ and is by it conveyed along the shield $x$ and once more presented to the fine-comb cylinder $h'$, to be operated upon as above described.

At 20 is the fan employed for exhausting the cages $t$, by means of an air-trunk, 21, from which there proceeds another trunk or channel, 22. This trunk forms a portion of the frame-work of the machine, and carries on its outside the axis 23 of the fine comb-cylinder, the end of which is formed with apertures 24.

During the operations of the machine, as above described, the fan 20 exhausts the air through the trunk and apertures 24, thereby establishing a partial vacuum in the fine-comb cylinder, and causing the fibrous material to be drawn onto its surface and to be retained there until stripped by the means above mentioned, the said current of air also carrying off dust and other fine particles.

As regards the first part of my invention, I have shown and described two fine-comb cylinders, but three or more may be employed if desired, after the manner above explained.

As regards the second part of my invention, it may be adapted to machines with one cylinder only, by placing the grid and spikes beneath the rollers $l\ n\ o$, instead of beneath a second set, $l'\ n'\ o'$.

In conclusion,

I claim as my invention and for the purposes above set forth—

1. The fine-comb cylinders $h$ and $h'$, with their respective sets of rollers and brushes $l\ n\ o$ and $l'\ n'\ o'$, rollers $w$ and $w'$, and casing $p$, arranged substantially as herein shown and described.

2. The combination of the grid, the rising and falling and traversing spikes, with the comb-cylinder $h'$ and the rollers $l'\ n'$ and brush $o'$, substantially as specified.

WILLIAM RICHARDSON.

Witnesses:
   WM. TUDOR MABLEY,
      20 *St. Ann's-street, Manchester.*
   W. T. CHEETHAM,
      20 *St. Ann's-street, Manchester.*